UNITED STATES PATENT OFFICE.

ALBERT E. BARTON, OF ENSLEY, AND GEORGE B. McCORMACK, OF PRATT MINES, ALABAMA.

PROCESS OF REFINING IRON.

SPECIFICATION forming part of Letters Patent No. 519,902, dated May 15, 1894.

Application filed April 24, 1893. Serial No. 471,696. (No specimens.)

*To all whom it may concern:*

Be it known that we, ALBERT E. BARTON, a subject of the Queen of Great Britain, (having declared my intention to become a citizen of the United States,) residing at Ensley, and GEORGE B. McCORMACK, a citizen of the United States, residing at Pratt Mines, Jefferson county, Alabama, have invented an Improved Process of Refining Ores, of which the following is a specification.

It is well known that the sesquioxide of iron does not possess magnetic qualities but metallic iron and compounds having protoxide of iron therein are magnetic. To reduce the sesquioxide, therefore, to some lower oxide showing magnetic qualities, and then to treat the reduced ore by some form of magnetic concentration by which impurities mixed with the ore may be mechanically separated therefrom, is the object of our invention.

Our invention relates to the treatment of red hematite ores by which these ores may be freed from impurities, and consists generally in the reduction of the sesquioxide of iron to magnetic oxide, or to some still lower oxide possessing magnetic qualities in the manner hereinafter described and pointed out in the claims. To accomplish this object, in practice, we take a suitable quantity of the original red hematite ore and expose it to the action of some reducing gas at a comparatively low temperature, preferably about 800° Fahrenheit. The reducing gas seizes upon a portion of the oxygen in the sesquioxide and converts it into an oxide which is magnetic, without reducing it to metallic iron thereby putting the ore in proper condition for magnetic concentration.

The gases we prefer to use are the waste gas from ordinary coke ovens or blast furnaces, or producer gas, but any gas containing carbonic oxide, hydrogen, or other suitable reducing agents in proper proportion would effect the same result, and come properly within our invention.

The reducing gas used in our process may be obtained in any well known way or by mixing coal, charcoal, or coke with the ore in the reducing furnace.

We have in practice found it necessary to have the gas in such proportions or quantities and at such temperatures that the sesquioxide may be only partially reduced to a lower oxide, and not to metallic iron; for with too great reducing action the sesquioxide is reduced, wholly or partially, to metallic iron which is undesirable. And furthermore at too high a temperature fusion will take place and the silica, which is present in the ore, will combine with the oxide of iron, forming a silicate of iron which is not adapted for magnetic concentration.

The process of magnetic concentration is well known but it has not hitherto been successfully applied to the concentration of non-magnetic red hematite ores; and it is to such ores that our process is specially applicable.

The preparation of non-magnetic ores for magnetic concentration has generally been performed in a roasting furnace and in a non-reducing atmosphere, and has been generally confined to hydrated sesquioxides.

Any known form of magnetic machine for concentrating ores may be used, in carrying out our process, and any style of reducing furnace may be employed.

The temperature of the ore during the first step of the process may be varied within certain limits, determined by the conditions of the ore, the quantity charged, &c.; but always with a due regard to the injurious effects of too high a temperature as above stated. These matters are within the control of the metallurgist, and we wish it clearly understood that we do not limit ourselves in this or any other similar matter of detail, such as the amount of ore to charge, the proportion of gas to each charge, &c.; all of which are within the judgment of the skilled metallurgist, and may consequently be varied without departing from the spirit of our invention.

What we claim as our invention is—

1. The herein described process of clearing red hematite ores of impurities which consists in subjecting the ores to the action of a reducing gas at a temperature of about 800° Fahrenheit without reducing said ores to metallic iron and then concentrating the treated ore magnetically, substantially as described.

2. The process of refining red hematite ores which consists in subjecting the ores to the action of a reducing gas in a reducing furnace at a temperature of about 800° Fahrenheit without reducing the said ores to metallic iron, and then mechanically separating the impurities by magnetic concentration, substantially as described.

3. The process of refining red hematite ores which consists in subjecting the ores in a reducing chamber to the action of waste gases from coke ovens at a temperature of about 800° Fahrenheit, without metallic reduction and then subjecting the treated ore to magnetic concentration, substantially as described.

In testimony whereof we have signed our names to this specification in the presence of two subscribing witnesses.

ALBERT E. BARTON.
GEORGE B. McCORMACK.

Witnesses:
R. T. FRAZIER,
WM. H. DE LACY.